(12) United States Patent
Chao et al.

(10) Patent No.: US 8,085,726 B2
(45) Date of Patent: *Dec. 27, 2011

(54) HIGH SPEED DOWNLINK SHARED CHANNEL CELL CHANGE

(75) Inventors: Yi-Ju Chao, Huntington Station, NY (US); Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1084 days.

This patent is subject to a terminal disclaimer.

(21) Appl. No.: 10/787,800

(22) Filed: Feb. 26, 2004

(65) Prior Publication Data

US 2004/0165554 A1    Aug. 26, 2004

Related U.S. Application Data

(63) Continuation of application No. 10/334,489, filed on Dec. 30, 2002, now Pat. No. 6,717,927.

(60) Provisional application No. 60/370,740, filed on Apr. 5, 2002.

(51) Int. Cl.
 *H04W 4/00* (2009.01)
(52) U.S. Cl. ....................................... 370/331
(58) Field of Classification Search .................. 370/329, 370/331, 436; 455/437–439
See application file for complete search history.

(56) References Cited

U.S. PATENT DOCUMENTS

| | | | |
|---|---|---|---|
| 5,471,207 A | 11/1995 | Zandi et al. |
| 5,491,728 A | 2/1996 | Verhille et al. |
| 5,673,307 A | 9/1997 | Holland et al. |
| 5,751,719 A | 5/1998 | Chen et al. |
| 5,940,381 A | 8/1999 | Freeburg et al. |
| 5,974,036 A | 10/1999 | Acharya et al. |
| 6,131,030 A | 10/2000 | Schön et al. |
| 6,181,940 B1 | 1/2001 | Rune |
| 6,230,013 B1 | 5/2001 | Wallentin et al. |
| 6,233,454 B1 | 5/2001 | Sato |
| 6,337,983 B1 | 1/2002 | Bonta et al. |
| 6,385,184 B2 | 5/2002 | Kitade et al. |
| 6,445,917 B1 | 9/2002 | Bark et al. |
| 6,466,556 B1 | 10/2002 | Boudreaux |
| 6,493,541 B1 | 12/2002 | Gunnarsson et al. |
| 6,507,572 B1 | 1/2003 | Kumar et al. |
| 6,532,364 B1 | 3/2003 | Uchida et al. |
| 6,546,001 B1 | 4/2003 | Semper et al. |

(Continued)

FOREIGN PATENT DOCUMENTS

CN    1378357    11/2002

(Continued)

OTHER PUBLICATIONS

3GPP Technical Specification 25.308 v5.1.0; High Speed Downlink Packet Access (HSDPA); Overall Description; Stage 2 (Release 5), Dec. 2001.*

(Continued)

*Primary Examiner* — Yong Zhou

(74) *Attorney, Agent, or Firm* — Volpe and Koenig, P.C.

(57) ABSTRACT

In response to initiation of a high speed-downlink shared channel (HS-DSCH) cell change, a reordering buffer of a medium access controller-high speed (MAC-hs) is flushed. A user equipment (UE) for at least one radio link control (RLC) instance mapped to the HS-DSCH generates a status report. The status report indicates missing HS-DSCH packet data units (PDUs).

6 Claims, 2 Drawing Sheets

U.S. PATENT DOCUMENTS

| | | |
|---|---|---|
| 6,553,015 B1 | 4/2003 | Sato |
| 6,553,231 B1 | 4/2003 | Karlsson et al. |
| 6,567,670 B1 | 5/2003 | Petersson |
| 6,621,793 B2 | 9/2003 | Widegren et al. |
| 6,678,249 B2 | 1/2004 | Toskala et al. |
| 6,681,112 B1 | 1/2004 | Schwarz et al. |
| 6,717,927 B2 | 4/2004 | Chao et al. |
| 6,744,778 B1 | 6/2004 | Allpress et al. |
| 6,839,329 B1 | 1/2005 | Sato et al. |
| 6,901,063 B2 | 5/2005 | Vayanos et al. |
| 6,975,881 B2 | 12/2005 | Sheynman et al. |
| 7,010,318 B2 | 3/2006 | Chang et al. |
| 7,054,633 B2 | 5/2006 | Seo et al. |
| 2001/0012279 A1 | 8/2001 | Haumont et al. |
| 2001/0021180 A1* | 9/2001 | Lee et al. ............ 370/336 |
| 2001/0046211 A1 | 11/2001 | Maruwaka et al. |
| 2002/0001296 A1 | 1/2002 | Lee et al. |
| 2002/0107019 A1 | 8/2002 | Mikola et al. |
| 2003/0016698 A1 | 1/2003 | Chang et al. |
| 2003/0039270 A1 | 2/2003 | Chang et al. |
| 2003/0147370 A1 | 8/2003 | Wu |
| 2003/0189909 A1 | 10/2003 | Chao et al. |
| 2004/0179619 A1 | 9/2004 | Tian et al. |
| 2004/0229626 A1 | 11/2004 | Yi et al. |
| 2005/0281222 A1 | 12/2005 | Ranta-Aho et al. |
| 2006/0034204 A1 | 2/2006 | Lee et al. |
| 2007/0121542 A1 | 5/2007 | Lohr et al. |

FOREIGN PATENT DOCUMENTS

| | | |
|---|---|---|
| EP | 1 233 638 | 8/2002 |
| EP | 1 263 159 | 12/2002 |
| JP | 11-331208 | 11/1999 |
| JP | H11-331208 | 11/1999 |
| JP | 2000-59459 | 2/2000 |
| JP | 2000-115059 | 4/2000 |
| JP | 2001-500675 | 1/2001 |
| JP | 2001-148879 | 5/2001 |
| KR | 2001-0026301 | 4/2001 |
| RU | 2000118981 | 7/2002 |
| TW | 352496 | 2/1999 |
| WO | 99/17469 | 4/1999 |
| WO | 00/18051 | 3/2000 |
| WO | 00/74341 | 12/2000 |
| WO | 01/05121 | 1/2001 |
| WO | 01/39408 | 5/2001 |
| WO | 01/50672 | 7/2001 |
| WO | 02/01769 | 1/2002 |
| WO | 02/37872 | 5/2002 |
| WO | 02/037872 | 5/2002 |
| WO | 02/069547 | 9/2002 |
| WO | 03/005629 | 1/2003 |

OTHER PUBLICATIONS

3GPP Technical Specification 25.322 v3.5.0; RLC protocol specification (Release 1999), Dec. 2000.*

3GPP TS 25.308, "High Speed Downlink Packet Access (HSDA); Overall description", V5.2.0, Mar. 2002.*

3GPP TS 25.322, "3rd Generation Partnership Project; Technical Specification Group Radio Access Network; Radio Link Control (RLC) Protocol Specification (Release 1999)", V3.12.1, Sep. 2002.

3GPP TS 25.308, "3rd Generation Partnership Project; Technical Specification Group Radio Access Network; High Speed Downlink Packet Access (HSDPA); Overall Discription; Stage 2 (Release 5)", V5.2.0, Mar. 2002.

3GPP TS 25.322, "3rd Generation Partnership Project; Technical Specification Group Radio Access Network; Radio Link Control (RLC) Protocol Specification (Release 1999)", V3.10.0, Mar. 2002.

Motorola, "HS-DSCH Cell Change", TSG-RAN Working Group 2 Meeting #24, R2-012391, (New York, Oct. 22-26, 2001).

Third Generation Partnership Project, "Technical Specification Group Radio Access Network; MAC Protocol Specification (Release 1999)", 3GPP TS 25.321 V3.13.0, (Sep. 2002).

Third Generation Partnership Project, "Technical Specification Group Radio Access Network; MAC Protocol Specification (Release 4)", 3GPP TS 25.321 V4.6.0 (Sep. 2002).

Third Generation Partnership Project, "Technical Specification Group Radio Access Network; MAC Protocol Specification (Release 5)", 3GPP TS 25.321, V5.0.0 (Mar. 2002).

Third Generation Partnership Project, "Technical Specification Group Radio Access Network; MAC Protocol Specification (Release 5)", 3GPP TS 25.321, V5.2.0 (Sep. 2002).

Third Generation Partnership Project, "Technical Specification Group Radio Access Network; MAC Protocol Specification (Release 4)", 3GPP TS 25.321, V4.4.0 (Mar. 2002).

Third Generation Partnership Project, "Technical Specification Group Radio Access Network; Radio Resource Control (RRC) Protocol Specification (Release 1999)", 3GPP TS 25.331, V3.12.0 (Sep. 2002).

Third Generation Partnership Project, "Technical Specification Group Radio Access Network; Radio Resource Control (RRC) Protocol Specification (Release 1999)", 3GPP TS 25.331, V3.10.0 (Mar. 2002).

Third Generation Partnership Project, "Technical Specification Group Radio Access Network; Radio Resource Control (RRC) Protocol Specification (Release 4)", 3GPP TS 25.331, V4.4.0 (Mar. 2002).

Third Generation Partnership Project, "Technical Specification Group Radio Access Network; Radio Resource Control (RRC) Protocol Specification (Release 4)", 3GPP TS 25.331, V4.7.0 (Sep. 2002).

Third Generation Partnership Project, "Technical Specification Group Radio Access Network; Radio Resource Control (RRC) Protocol Specification (Release 5)", 3GPP TS 25.331, V5.0.0 (Mar. 2002).

Third Generation Partnership Project, "Technical Specification Group Radio Access Network; Radio Resource Control (RRC) Protocol Specification (Release 5)", 3GPP TS 25.331, V5.2.0 (Sep. 2002).

Third Generation Partnership Project, "Technical Specification Group Radio Access Network; RLC protocol specification (Release 1999)," 3GPP TS 25.322 V3.12.1 (Sep. 2002).

Third Generation Partnership Project, "Technical Specification Group Radio Access Network; High Speed Downlink Packet Access (HSDPA); Overall Description; Stage 2 (Release 5)," 3GPP TS 25.308 V5.2.0 (Mar. 2002).

Third Generation Partnership Project, "Technical Specification Group Radio Access Network; RLC protocol specification (Release 1999)," 3GPP TS 25.322 V3.10.0 (Mar. 2002).

Third Generation Partnership Project, "Technical Specification Group Services and System Aspects; Digital Cellular Telecommunications System (Phase 2+); General Packet Radio Service (GPRS); Service Description; Stage 2 (3G TS 23.060 Version 3.2.0)", 3G TS 23.060 Draft V3.2.0 (Dec. 1999).

Third Generation Partnership Project, "Technical Specification Group Radio Access Network; High Speed Downlink Packet Access (HSDPA); Overall Desctription; Stage 2 (Release 5)", 3GPP TS 25.308 V5.1.0 (Dec. 2001).

Third Generation Partnership Project, "Technical Specification Group Radio Access Network; RLC protocol specification (Release 1999)," 3GPP TS 25.322 V3.12.0 (Sep. 2002).

Third Generation Partnership Project, "Technical Specification Group Radio Access Network; RLC protocol specification (Release 4)," 3GPP TS 25.322 V4.4.0 (Mar. 2002).

Third Generation Partnership Project, "Technical Specification Group Radio Access Network; RLC protocol specification (Release 4)," 3GPP TS 25.322 V4.6.0 (Mar. 2002).

Third Generation Partnership Project, "Technical Specification Group Radio Access Network; RLC protocol specification (Release 5)," 3GPP TS25.322 V5.0.0 (Mar. 2002).

Third Generation Partnership Project, "Technical Specification Group Radio Access Network; RLC protocol specification (Release 5)," 3GPP TS 25.322 V5.2.0 (Sep. 2002).

Third Generation Partnership Project, "Technical Specification Group Services and System Aspects; Digital Cellular Telecommunications System (Phase 2+); General Packet Radio Service (GPRS); Service Description; Stage 2 (Release 1999)", 3GPP TS 23.060 V3.10.0 (Jan. 2002).

Third Generation Partnership Project, "Technical Specification Group Services and System Aspects; Digital Cellular Telecommunications System (Phase 2+); General Packet Radio Service (GPRS); Service Description; Stage 2 (Release 1999)", 3GPP TS 23.060 V3.13.0 (Sep. 2002).
Third Generation Partnership Project, "Technical Specification Group Services and System Aspects; Digital Cellular Telecommunications System (Phase 2+); General Packet Radio Service (GPRS); Service Description; Stage 2 (Release 4)", 3GPP TS 23.060 V4.3.0 (Jan. 2002).
Third Generation Partnership Project, "Technical Specification Group Services and System Aspects; Digital Cellular Telecommunications System (Phase 2+); General Packet Radio Service (GPRS); Service Description; Stage 2 (Release 4)", 3GPP TS 23.060 V4.6.0 (Sep. 2002).
Third Generation Partnership Project, "Technical Specification Group Services and System Aspects; Digital Cellular Telecommunications System (Phase 2+); General Packet Radio Service (GPRS); Service Description; Stage 2 (Release 5)", 3GPP TS 23.060 V5.0.0 (Jan. 2002).
Third Generation Partnership Project, "Technical Specification Group Services and System Aspects; Digital Cellular Telecommunications System (Phase 2+); General Packet Radio Service (GPRS); Service Description; Stage 2 (Release 5)", 3GPP TS 23.060 V5.3.0 (Sep. 2002).
Third Generation Partnership Project, "Technical Specification Group Radio Access Network; MAC Protocol Specification (Release 1999)", 3GPP TS 25.321 V3.11.0, (Mar. 2002).
Third Generation Partnership Project, "Universal Mobile Telecommunications System (UMTS); Radio Link Control (RLC) Protocol Specification (3GPP TS 25.322 Version 5.0.0 Release 5)", ETSI TS 125 322 V5.0.0 (Mar. 2002).
Third Generation Partnership Project, "Universal Mobile Telecommunications System (UMTS); Radio Link Control (RLC) Protocol Specification (3GPP TS 25.322 Version 5.3.0 Release 5)", ETSI TS 125 322 V5.3.0 (Dec. 2002).
Motorola, "HS-DSCH Cell Change", TSG-RAN Working Group 2 Meeting #24, R2-012391, (New York, Oct. 22-26, 2001).
Third Generation Partnership Project, "Technical Specification Group Radio Access Network; MAC Protocol Specification (Release 1999)", 3GPP TS 25.321 V3.13.0, (Sep. 2002).
Third Generation Partnership Project, "Technical Specification Group Radio Access Network; MAC Protocol Specification (Release 4)", 3GPP TS 25.321 V4.6.0 (Sep. 2002).
Third Generation Partnership Project, "Technical Specification Group Radio Access Network; MAC Protocol Specification (Release 5)", 3GPP TS 25.321, V5.0.0 (Mar. 2002).
Third Generation Partnership Project, "Technical Specification Group Radio Access Network; MAC Protocol Specification (Release 5)", 3GPP TS 25.321, V5.2.0 (Sep. 2002).
Third Generation Partnership Project, "Technical Specification Group Radio Access Network; MAC Protocol Specification (Release 4)", 3GPP TS 25.321, V4.4.0 (Mar. 2002).
Third Generation Partnership Project, "Technical Specification Group Radio Access Network; Radio Resource Control (RRC) Protocol Specification (Release 1999)", 3GPP TS 25.331, V3.12.0 (Sep. 2002).
Third Generation Partnership Project, "Technical Specification Group Radio Access Network; Radio Resource Control (RRC) Protocol Specification (Release 1999)", 3GPP TS 25.331, V3.10.0 (Mar. 2002).
Third Generation Partnership Project, "Technical Specification Group Radio Access Network; Radio Resource Control (RRC) Protocol Specification (Release 4)", 3GPP TS 25.331, V4.4.0 (Mar. 2002).
Third Generation Partnership Project, "Technical Specification Group Radio Access Network; Radio Resource Control (RRC) Protocol Specification (Release 4)", 3GPP TS 25.331, V4.7.0 (Sep. 2002).
Third Generation Partnership Project, "Technical Specification Group Radio Access Network; Radio Resource Control (RRC) Protocol Specification (Release 5)", 3GPP TS 25.331 V5.0.0 (Mar. 2002).
Third Generation Partnership Project, "Technical Specification Group Radio Access Network; Radio Resource Control (RRC) Protocol Specification (Release 5)", 3GPP TS 25.331, V5.2.0 (Sep. 2002).
Third Generation Partnership Project, "Technical Specification Group Radio Access Network; RLC protocol specification (Release 1999)" 3GPP TS 25.322 V3.12.1 (Sep. 2002).
Third Generation Partnership Project, "Technical Specification Group Radio Access Network; High Speed Downlink Packet Access (HSDPA); Overall Description; Stage 2 (Release 5)," 3GPP TS 25.308 V5.2.0 (Mar. 2002).
Third Generation Partnership Project, "Technical Specification Group Radio Access Network; RLC protocol specification (Release 1999)" 3GPP TS 25.322 V3.10.0 (Mar. 2002).
Third Generation Partnership Project, "Technical Specification Group Services and System Aspects; Digital Cellular Telecommunications System (Phase 2+); General Packet Radio Service (GPRS); Service Description; Stage 2 (3G TS 23.060 Version 3.2.0)", 3G TS 23.060 Draft V3.2.0 (Dec. 1999).
Third Generation Partnership Project, "Technical Specification Group Radio Access Network; High Speed Downlink Packet Access (HSDPA); Overall Desctription; Stage 2 (Release 5)", 3GPP TS 25.308 V5.1.0, (Dec. 2001).
Third Generation Partnership Project, "Technical Specification Group Radio Access Network; RLC protocol specification (Release 1999)", 3GPP TS 25.322 V3.12.0 (Sep. 2002).
Third Generation Partnership Project, "Technical Specification Group Radio Access Network; RLC protocol specification (Release 4)," 3GPP TS 25.322 V4.4.0 (Mar. 2002).
Third Generation Partnership Project, "Technical Specification Group Radio Access Network; RLC Protocol Specification (Release 4)," 3GPP TS 25.322 V4.6.0 (Mar. 2002).
Third Generation Partnership Project, "Technical Specification Group Radio Access Network; RLC protocol specification (Release 5)," 3GPP TS 25.322 V5.0.0 (Mar. 2002).
Third Generation Partnership Project, "Technical Specification Group Radio Access Network; RLC protocol specification (Release 5)," 3GPP TS 25.322 V5.2.0 (Sep. 2002).
Third Generation Partnership Project, "Technical Specification Group Services and System Aspects; Digital Cellular Telecommunications System (Phase 2+); General Packet Radio Service (GPRS); Service Description; Stage 2 (Release 1999)", 3GPP TS 23.060 V3.10.0 (Jan. 2002).
Third Generation Partnership Project, "Technical Specification Group Services and System Aspects; Digital Cellular Telecommunications System (Phase 2+); General Packet Radio Service (GPRS); Service Description; Stage 2 (Release 1999)", 3GPP TS 23.060 V3.13.0 (Sep. 2002).
Third Generation Partnership Project, "Technical Specification Group Services and System Aspects; Digital Cellular Telecommunications System (Phase 2+); General Packet Radio Service (GPRS); Service Description; Stage 2 (Release 4)", 3GPP TS 23.060 V4.3.0 (Jan. 2002).
Third Generation Partnership Project, "Technical Specification Group Services and System Aspects; Digital Cellular Telecommunications System (Phase 2+); General Packet Radio Service (GPRS); Service Description; Stage 2 (Release 4)", 3GPP TS 23.060 V4.6.0 (Sep. 2002).
Third Generation Partnership Project, "Technical Specification Group Services and System Aspects; Digital Cellular Telecommunications System (Phase 2+); General Packet Radio Service (GPRS); Service Description; Stage 2 (Release 5)", 3GPP TS 23.060 V5.0.0 (Jan. 2002).
Third Generation Partnership Project, "Technical Specification Group Services and System Aspects; Digital Cellular Telecommunications System (Phase 2+); General Packet Radio Service (GPRS); Service Description; Stage 2 (Release 5)", 3GPP TS 23.060 V5.3.0 (Sep. 2002).
Third Generation Partnership Project, "Technical Specification Group Radio Access Network; MAC Protocol Specification (Release 1999)", 3GPP TS 25.321 V3.11.0, (Mar. 2002).

Third Generation Partnership Project, "Universal Mobile Telecommunications System (UMTS); Radio Link Control (RLC) Protocol Specification (3GPP TS 25.322 Version 5.0.0 Release 5)", ETSI TS 125 322 V5.0.0 (Mar. 2002).

Third Generation Partnership Project, "Universal Mobile Telecommunications System (UMTS); Radio Link Control (RLC) Protocol Specification (3GPP TS 25.322 Version 5.3.0 Release 5)", ETSI TS 125 322 V5.3.0 (Dec. 2002).

Third Generation Partnership Project, "Technical Specification Group Radio Access Network; RLC protocol specification (Release 4)," 3GPP TS 25.322 V4.4.0 (Mar. 2002).

Third Generation Partnership Project, "Technical Specification Group Radio Access Network; RLC protocol specification (Release 4)," 3GPP TS 25.322 V4.6.0 (Mar. 2002).

Third Generation Partnership Project, "Technical Specification Group Radio Access Network; RLC protocol specification (Release 5)," 3GPP TS 25.322 V5.0.0 (Mar. 2002).

Third Generation Partnership Project, "Technical Specification Group Radio Access Network; RLC protocol specification (Release 5,)" 3GPP TS 25.322 V5.2.0 (Sep. 2002).

Third Generation Partnership Project, "Technical Specification Group Services and System and System Aspects; Digital Cellular Telecommunications System (Phase 2+); General Packet Radio Service (GPRS); Service Description; Stage 2 (Release 1999)", 3GPP TS 23.060 V3.10.0 (Jan. 2002).

Third Generation Partnership Project, "Technical Specification Group Services and System Aspects; Digital Cellular Telecommunications System (Phase 2+); General Packet Radio Service (GPRS); Service Description; Stage 2 (Release 1999)", 3GPP TS 23.060 V3.13.0 (Sep. 2002).

Third Generation Partnership Project, "Technical Specification Group Services and System Aspects; Digital Cellular Telecommunications System (Phase 2+); General Packet Radio Service (GPRS); Service Description; Stage 2 (Release 4)", 3GPP TS 23.060 V4.3.0 (Jan. 2002).

Third Generation Partnership Project, "Technical Specification Group Services and System Aspects; Digital Cellular Telecommunications System (Phase 2+); General Packet Radio Service (GPRS); Service Description; Stage 2 (Release 4)", 3GPP TS 23.060 V4.6.0 (Sep. 2002).

Third Generation Partnership Project, "Technical Specification Group Services and System Aspects; Digital Cellular Telecommunications System (Phase 2+); General Packet Radio Service (GPRS); Service Description; Stage 2 (Release 5)", 3GPP TS 23.060 V5.0.0 (Jan. 2002).

Third Generation Partnership Project, "Technical Specification Group Services and System and System Aspects; Digital Cellular Telecommunications System (Phase 2+); General Packet Radio Service (GPRS); Service Description; Stage 2 (Release 5)", 3GPP TS 23.060 V5.3.0 (Sep. 2002).

Third Generation Partnership Project, "Technical Specification Group Radio Access Network; RLC protocol specification (Release 1999)," 3GPP TS 25.322 V3.5.0 (Dec. 2000).

Third Generation Partnership Project, "Universal Mobile Telecommunications System (UMTS); Radio Link Control (RLC) Protocol Specification (3GPP TS 25.322 Version 5.0.0 Release 5)", ETSI TS 125 322 V5.0.0 (Mar. 2002).

Third Generation Partnership Project, "Universal Mobile Telecommunications System (UMTS); Radio Link Control (RLC) Protocol Specification (3GPP TS 25.322 Version 5.3.0 Release 5)", ETSI TS 125 322 V5.3.0 (Dec. 2002).

Motorola, "HS-DSCH Cell Change", TSG-RAN Working Group 2 Meeting #24, R2-012391, (New York, Oct. 22-26, 2001).

Third Generation Partnership Project, "Technical Specification Group Radio Access Network; MAC Protocol Specification (Release 1999)", 3GPP TS 25.321 V3.13.0, (Sep. 2002).

Third Generation Partnership Project, "Technical Specification Group Radio Access Network; MAC Protocol Specification (Release 4)", 3GPP TS 25.321 V4.6.0 (Sep. 2002).

Third Generation Partnership Project, "Technical Specification Group Radio Access Network; MAC Protocol Specification (Release 5)", 3GPP TS 25.321, V5.0.0 (Mar. 2002).

Third Generation Partnership Project, "Technical Specification Group Radio Access Network; MAC Protocol Specification (Release 5)", 3GPP TS 25.321, V5.2.0 (Sep. 2002).

Third Generation Partnership Project, "Technical Specification Group Radio Access Network; MAC Protocol Specification (Release 4)", 3GPP TS 25.321, V4.4.0 (Mar. 2002).

Third Generation Partnership Project, "Technical Specification Group Radio Access Network; Radio Resource Control (RRC) Protocol Specification (Release 1999)", 3GPP TS 25.331, V3.12.0 (Sep. 2002).

Third Generation Partnership Project, "Technical Specification Group Radio Access Network; Radio Resource Control (RRC) Protocol Specification (Release 1999)", 3GPP TS 25.331, V3.10.0 (Mar. 2002).

Third Generation Partnership Project, "Technical Specification Group Radio Access Network; Radio Resource Control (RRC) Protocol Specification (Release 4)", 3GPP TS 25.331, V4.4.0 (Mar. 2002).

Third Generation Partnership Project, "Technical Specification Group Radio Access Network; Radio Resource Control (RRC) Protocol Specification (Release 4)", 3GPP TS 25.331, V4.7.0 (Sep. 2002).

Third Generation Partnership Project, "Technical Specification Group Radio Access Network; Radio Resource Control (RRC) Protocol Specification (Release 5)", 3GPP TS 25.331, V5.0.0 (Mar. 2002).

Third Generation Partnership Project, "Technical Specification Group Radio Access Network; Radio Resource Control (RRC) Protocol Specification (Release 5)", 3GPP TS 25.331, V5.2.0 (Sep. 2002).

Third Generation Partnership Project, "Technical Specification Group Radio Access Network; RLC protocol specification (Release 1999)," 3GPP TS 25.322 V3.12.0 (Sep. 2002).

Third Generation Partnership Project, "Technical Specification Group Radio Access Network; High Speed Downlink Packet Access (HSDPA); Overall Description; Stage 2 (Release 5)," 3GPP TS 25.308 V5.2.0 (Mar. 2002).

Third Generation Partnership Project, "Technical Specification Group Radio Access Network; RLC protocol specification (Release 1999)," 3GPP TS 25.322 V3.10.0 (Mar. 2002).

Third Generation Partnership Project, "Technical Specification Group Services and System Aspects; Digital Cellular Telecommunications System (Phase 2+); General Packet Radio Service (GPRS); Service Description; Stage 2 (3G TS 23.060 Version 3.2.0)", 3G TS 23.060 Draft V3.2.0 (Dec. 1999).

Third Generation Partnership Project, "Technical Specification Group Radio Access Network; High Speed Downlink Packet Access (HSDPA); Overall Descrirption; Stage 2 (Release 5)", 3GPP TS 25.308 V5.1.0 (Dec. 2001).

Third Generation Partnership Project, "Technical Specification Group Radio Access Network; RLC protocol specification (Release 4)," 3GPP TS 25.322 V4.4.0 (Mar. 2002).

Third Generation Partnership Project, "Technical Specification Group Radio Access Network; RLC protocol specification (Release 4)," 3GPP TS 25.322 V4.6.0 (Mar. 2002).

Third Generation Partnership Project, "Technical Specification Group Radio Access Network; RLC protocol specification (Release 5)," 3GPP TS 25.322 V5.0.0 (Mar. 2002).

Third Generation Partnership Project, "Technical Specification Group Radio Access Network; RLC protocol specification (Release 5)," 3GPP TS 25.322 V5.2.0 (Sep. 2002).

Third Generation Partnership Project, "Technical Specification Group Services and System Aspects; Digital Cellular Telecommunications System (Phase 2+); General Packet Radio Service (GPRS); Service Description; Stage 2 (Release 1999)", 3GPP TS 23.060 V3.10.0 (Jan. 2002).

Third Generation Partnership Project, "Technical Specification Group Services and System Aspects; Digital Cellular Telecommunications System (Phase 2+); General Packet Radio Service (GPRS); Service Description; Stage 2 (Release 1999)", 3GPP TS 23.060 V3.13.0 (Sep. 2002).

Third Generation Partnership Project, "Technical Specification Group Services and System Aspects; Digital Cellular Telecommunications System (Phase 2+); General Packet Radio Service (GPRS); Service Description; Stage 2 (Release 4)", 3GPP TS 23.060 V4.3.0 (Jan. 2002).

Third Generation Partnership Project, "Technical Specification Group Services and System Aspects; Digital Cellular Telecommunications System (Phase 2+); General Packet Radio Service (GPRS); Service Description; Stage 2 (Release 4)", 3GPP TS 23.060 V4.6.0 (Sep. 2002).

Third Generation Partnership Project, "Technical Specification Group Services and System Aspects; Digital Cellular Telecommunications System (Phase 2+); General Packet Radio Service (GPRS); Service Description; Stage 2 (Release 5)", 3GPP TS 23.060 V5.0.0 (Jan. 2002).

Third Generation Partnership Project, "Technical Specification Group Services and System Aspects; Digital Cellular Telecommunications System (Phase 2+); General Packet Radio Service (GPRS); Service Description; Stage 2 (Release 5)", 3GPP TS 23.060 V5.3.0 (Sep. 2002).

Third Generation Partnership Project, "Technical Specification Group Radio Access Network; MAC Protocol Specification (Release 1999", 3GPP TS 25.321 V3.11.0 (Mar. 2002).

Third Generation Partnership Project, "Universal Mobile Telecommunications System (UMTS); Radio Link Control (RLC) Protocol Specification (3GPP TS 25.322 Version 5.0.0 Release 5)", ETSI TS 125 322 V5.0.0 (Mar. 2002).

"MAC-hs Reset." 3GPP TSG RAN WG2#28, Kobe, Japan, Apr. 8-12, 2002, Tdoc R2-020752.

"RLC Status Upon Handover for Efficient Recovery of Node-B Buffered Data." 3GPP TSG RAN WG2#31, Stockholm, Sweden, Aug. 19-23, 2002, Tdoc R2-021998.

Third Generation Partnership Project, "Technical Specification Group Radio Access Network; MAC Protocol Specification (Release 1999)", 3GPP TS 25.321 V3.13.0, (Sep. 2002).

Third Generation Partnership Project, "Technical Specification Group Radio Access Network; MAC Protocol Specification (Release 4)", 3GPP TS 25.321 V4.6.0 (Sep. 2002).

Third Generation Partnership Project, "Technical Specification Group Radio Access Network; MAC Protocol Specification (Release 5)", 3GPP TS 25.321, V5.0.0 (Mar. 2002).

Third Generation Partnership Project, "Technical Specification Group Radio Access Network; MAC Protocol Specification (Release 5)", 3GPP TS 25.321, V5.2.0 (Sep. 2002).

Third Generation Partnership Project, "Technical Specification Group Radio Access Network; MAC Protocol Specification (Release 4)", 3GPP TS 25.321, V4.4.0 (Mar. 2002).

Third Generation Partnership Project, "Technical Specification Group Radio Access Network; Radio Resource Control (RRC) Protocol Specification (Release 1999)", 3GPP TS 25.331, V3.12.0 (Sep. 2002).

Third Generation Partnership Project, "Technical Specification Group Radio Access Network; Radio Resource Control (RRC) Protocol Specification (Release 1999)", 3GPP TS 25.331, V3.10.0 (Mar. 2002).

Third Generation Partnership Project, "Technical Specification Group Radio Access Network; Radio Resource Control (RRC) Protocol Specification (Release 4)", 3GPP TS 25.331, V4.4.0 (Mar. 2002).

Third Generation Partnership Project, "Technical Specification Group Radio Access Network; Radio Resource Control (RRC) Protocol Specification (Release 4)", 3GPP TS 25.331, V4.7.0 (Sep. 2002).

Third Generation Partnership Project, "Technical Specification Group Radio Access Network; Radio Resource Control (RRC) Protocol Specification (Release 5)", 3GPP TS 25.331, V5.0.0 (Mar. 2002).

Third Generation Partnership Project, "Technical Specification Group Radio Access Network; Radio Resource Control (RRC) Protocol Specification (Release 5)", 3GPP TS 25.331, V5.2.0 (Sep. 2002).

Third Generation Partnership Project, "Technical Specification Group Radio Access Network; RLC protocol specification (Release 1999)," 3GPP TS 25.322 V3.12.0 (Sep. 2002).

Third Generation Partnership Project, "Technical Specification Group Radio Access Network; High Speed Downlink Packet Access (HSDPA); Overall Description; Stage 2 (Release 5)," 3GPP TS 25.308 V5.2.0 (Mar. 2002).

Third Generation Partnership Project, "Technical Specification Group Radio Access Network; RLC protocol specification (Release 1999)," 3GPP TS 25.322 V3.10.0 (Mar. 2002).

Third Generation Partnership Project, "Technical Specification Group Services and System Aspects; Digital Cellular Telecommunications System (Phase 2+); General Packet Radio Service (GPRS); Service Description; Stage 2 (3G TS 23.060 Version 3.2.0)", 3G TS 23.060 Draft V3.2.0 (Dec. 1999).

Third Generation Partnership Project, "Technical Specification Group Radio Access Network; High Speed Downlink Packet Access (HSDPA); Overall Desctription; Stage 2 (Release 5)", 3GPP TS 25.308 V5.1.0 (Dec. 2001).

Third Generation Partnership Project, "Technical Specification Group Radio Access Network; RLC protocol specification (Release 4)," 3GPP TS 25.322 V4.4.0 (Mar. 2002).

Third Generation Partnership Project, "Technical Specification Group Radio Access Network; RLC protocol specification (Release 4)," 3GPP TS 25.322 V4.6.0 (Mar. 2002).

Third Generation Partnership Project, "Technical Specification Group Radio Access Network; RLC protocol specification (Release 5)," 3GPP TS 25.322 V5.0.0 (Mar. 2002).

Third Generation Partnership Project, "Technical Specification Group Radio Access Network; RLC protocol specification (Release 5)," 3GPP TS 25.322 V5.2.0 (Sep. 2002).

Third Generation Partnership Project, "Technical Specification Group Services and System Aspects; Digital Cellular Telecommunications System (Phase 2+); General Packet Radio Service (GPRS); Service Description; Stage 2 (Release 1999)", 3GPP TS 23.060 V3.10.0 (Jan. 2002).

Third Generation Partnership Project, "Technical Specification Group Services and System Aspects; Digital Cellular Telecommunications System (Phase 2+); General Packet Radio Service (GPRS); Service Description; Stage 2 (Release 1999)", 3GPP TS 23.060 V3.13.0 (Sep. 2002).

Third Generation Partnership Project, "Technical Specification Group Services and System Aspects; Digital Cellular Telecommunications System (Phase 2+); General Packet Radio Service (GPRS); Service Description; Stage 2 (Release 4)", 3GPP TS 23.060 V4.3.0 (Jan. 2002).

Third Generation Partnership Project, "Technical Specification Group Services and System Aspects; Digital Cellular Telecommunications System (Phase 2+); General Packet Radio Service (GPRS); Service Description; Stage 2 (Release 4)", 3GPP TS 23.060 V4.6.0 (Sep. 2002).

Third Generation Partnership Project, "Technical Specification Group Services and System Aspects; Digital Cellular Telecommunications System (Phase 2+); General Packet Radio Service (GPRS); Service Description; Stage 2 (Release 5)", 3GPP TS 23.060 V5.0.0 (Jan. 2002).

Third Generation Partnership Project, "Technical Specification Group Services and System Aspects; Digital Cellular Telecommunications System (Phase 2+); General Packet Radio Service (GPRS); Service Description; Stage 2 (Release 5)", 3GPP TS 23.060 V5.3.0 (Sep. 2002).

Third Generation Partnership Project, "Technical Specification Group Radio Access Network; MAC Protocol Specification (Release 1999)", 3GPP TS 25.321 V3.11.0, (Mar. 2002).

Third Generation Partnership Project, "Technical Specification Group Radio Access Network; RLC protocol specification (Release 1999)," 3GPP TS 25.322 V3.5.0 (Dec. 2000).

Third Generation Partnership Project, "Universal Mobile Telecommunications System (UMTS); Radio Link Control (RLC) Protocol Specification (3GPP TS 25.322 Version 5.0.0 Release 5)", ETSI TS 125 322 V5.0.0 (Mar. 2002).

Third Generation Partnership Project, "Universal Mobile Telecommunications System (UMTS); Radio Link Control (RLC) Protocol Specification (3GPP TS 25.322 Version 5.3.0 Release 5)", ETSI TS 125 322 V5.3.0 (Dec. 2002).

Third Generation Partnership Project, "Technical Specification Group Radio Access Network; Radio Resource Control (RRC) Protocol Specification (Release 1999)", 3GPP TS 25.331, V3.12.0 (Sep. 2002).

Third Generation Partnership Project, "Technical Specification Group Radio Access Network; Radio Resource Control (RRC) Protocol Specification (Release 1999)", 3GPP TS 25.331, V3.10.0 (Mar. 2002).

Third Generation Partnership Project, "Technical Specification Group Radio Access Network; Radio Resource Control (RRC) Protocol Specification (Release 4)", 3GPP TS 25.331, V4.4.0 (Mar. 2002).

Third Generation Partnership Project, "Technical Specification Group Radio Access Network; Radio Resource Control (RRC) Protocol Specification (Release 4)", 3GPP TS 25.331, V4.7.0 (Sep. 2002).

Third Generation Partnership Project, "Technical Specification Group Radio Access Network; Radio Resource Control (RRC) Protocol Specification (Release 5)", 3GPP TS 25.331, V5.0.0 (Mar. 2002).

Third Generation Partnership Project, "Technical Specification Group Radio Access Network; Radio Resource Control (RRC) Protocol Specification (Release 5)", 3GPP TS 25.331, V5.2.0 (Sep. 2002).

Third Generation Partnership Project, "Technical Specification Group Radio Access Network; RLC protocol specification (Release 1999)," 3GPP TS 25.322 V3.12.0 (Sep. 2002).

Third Generation Partnership Project, "Technical Specification Group Radio Access Network; High Speed Downlink Packet Access (HSDPA); Overall Description; Stage 2 (Release 5)", 3GPP TS 25.308 V5.2.0 (Mar. 2002).

Third Generation Partnership Project, "Technical Specification Group Radio Access Network; RLC protocol specification (Release 1999)", 3GPP TS 25.322 V3.10.0 (Mar. 2002).

Third Generation Partnership Project, "Technical Specification Group Services and System Aspects; Digital Cellular Telecommunications System (Phase2+); General Packet Radio Service (GPRS); Service Description; Stage 2 (3G TS 23.060 Version 3.2.0)", 3G TS 23.060 Draft V3.2.0 (Dec. 1999).

Third Generation Partnership Project, "Technical Specification Group Radio Access Network; High Speed Downlink Packet Access (HSDPA); Overall Desctription; Stage 2 (Release 5)", 3GPP TS 25.308 V5.1.0 (Dec. 2001).

Third Generation Partnership Project, "Technical Specification Group Radio Access Network; RLC protocol specification (Release 4)," 3GPP TS 25.322 V4.4.0 (Mar. 2002).

Third Generation Partnership Project, "Technical Specification Group Radio Access Network; RLC protocol specification (Release 4)," 3GPP TS 25.322 V4.6.0 (Mar. 2002).

Third Generation Partnership Project, "Technical Specification Group Radio Access Network; RLC protocol specification (Release 5)," 3GPP TS 25.322 V5.0.0 (Mar. 2002).

Third Generation Partnership Project, "Technical Specification Group Radio Access Network; RLC protocol specification (Release 5)," 3GPP TS 25.322 V5.2.0 (Sep. 2002).

Third Generation Partnership Project, "Technical Specification Group Services and System Aspects; Digital Cellular Telecommunications System (Phase2+); General Packet Radio Service (GPRS); Service Description; Stage 2 (Release 1999)", 3GPP TS 23.060 V3.10.0 (Jan. 2002).

Third Generation Partnership Project, "Technical Specification Group Services and System Aspects; Digital Cellular Telecommunications System (Phase2+); General Packet Radio Service (GPRS); Service Description; Stage 2 (Release 1999)", 3GPP TS 23.060 V3.13.0 (Sep. 2002).

Third Generation Partnership Project, "Technical Specification Group Services and System Aspects; Digital Cellular Telecommunications System (Phase2+); General Packet Radio Service (GPRS); Service Description; Stage 2 (Release 4)", 3GPP TS 23.060 V4.3.0 (Jan. 2002).

Third Generation Partnership Project, "Technical Specification Group Services and System Aspects; Digital Cellular Telecommunications System (Phase2+); General Packet Radio Service (GPRS); Service Description; Stage 2 (Release 4)", 3GPP TS 23.060 V4.6.0 (Sep. 2002).

Third Generation Partnership Project, "Technical Specification Group Services and System Aspects; Digital Cellular Telecommunications System (Phase2+); General Packet Radio Service (GPRS); Service Description; Stage 2 (Release 5)", 3GPP TS 23.060 V5.0.0 (Jan. 2002).

Third Generation Partnership Project, "Technical Specification Group Services and System Aspects; Digital Cellular Telecommunications System (Phase2+); General Packet Radio Service (GPRS); Service Description; Stage 2 (Release 5)", 3GPP TS 23.060 V5.3.0 (Sep. 2002).

Third Generation Partnership Project, "Technical Specification Group Radio Access Network; MAC Protocol Specification (Release 1999)", 3GPP TS 25.321 V3.11.0, (Mar. 2002).

Third Generation Partnership Project, "Technical Specification Group Radio Access Network; RLC protocol specification (Release 1999)," 3GPP TS 25.322 V3.5.0 (Dec. 2000).

Third Generation Partnership Project, "Universal Mobile Telecommunications System (UMTS); Radio Link Control (RLC) Protocol Specification (3GPP TS 25.322 Version 5.0.0 Release 5)", ETSI TS 125 322 V5.0.0 (Mar. 2002).

Third Generation Partnership Project, "Universal Mobile Telecommunications System (UMTS); Radio Link Control (RLC) Protocol Specification (3GPP TS 25.322 Version 5.3.0 Release 5)", ETSI TS 125 322 V5.3.0 (Dec. 2002).

"MAC-hs Reset." 3GPP TSG RAN WG2#28, Kobe, Japan, Apr. 8-12, 2002, Tdoc R2-020752.

"RLC Status Upon Handover for Efficient Recovery of Node-B Buffered Data." 3GPP TSG RAN WG2#31, Stockholm, Sweden, Aug. 19-23, 2002, Tdoc R2-021998.

Motorola, "HS-DSCH Cell Change", TSG-RAN Working Group 2 Meeting #24, R2-012391, (New York, Oct. 22-26, 2001).

Third Generation Partnership Project, "Technical Specification Group Radio Access Network; MAC Protocol Specification (Release 1999)", 3GPP TS 25.321 V3.13.0, (Sep. 2002).

Third Generation Partnership Project, "Technical Specification Group Radio Access Network; MAC Protocol Specification (Release 4)", 3GPP TS 25.321 V4.6.0 (Sep. 2002).

Third Generation Partnership Project, "Technical Specification Group Radio Access Network; MAC Protocol Specification (Release 5)", 3GPP TS 25.321, V5.0.0 (Mar. 2002).

Third Generation Partnership Project, "Technical Specification Group Radio Access Network; MAC Protocol Specification (Release 5)", 3GPP TS 25.321, V5.2.0 (Sep. 2002).

Third Generation Partnership Project, "Technical Specification Group Radio Access Network; MAC Protocol Specification (Release 4)", 3GPP TS 25.321, V4.4.0 (Mar. 2002).

Third Generation Partnership Project, "Technical Specification Group Radio Access Network; Radio Resource Control (RRC) Protocol Specification (Release 1999)", 3GPP TS 25.331, V3.12.0 (Sep. 2002).

Third Generation Partnership Project, "Technical Specification Group Radio Access Network; Radio Resource Control (RRC) Protocol Specification (Release 1999)", 3GPP TS 25.331, V3.10.0 (Mar. 2002).

Third Generation Partnership Project, "Technical Specification Group Radio Access Network; Radio Resource Control (RRC) Protocol Specification (Release 4)", 3GPP TS 25.331, V4.4.0 (Mar. 2002).

Third Generation Partnership Project, "Technical Specification Group Radio Access Network; Radio Resource Control (RRC) Protocol Specification (Release 4)", 3GPP TS 25.331, V4.7.0 (Sep. 2002).

Third Generation Partnership Project, "Technical Specification Group Radio Access Network; Radio Resource Control (RRC) Protocol Specification (Release 5)", 3GPP TS 25.331, V5.0.0 (Mar. 2002).

Third Generation Partnership Project, "Technical Specification Group Radio Access Network; Radio Resource Control (RRC) Protocol Specification (Release 5)", 3GPP TS 25.331, V5.2.0 (Sep. 2002).

Third Generation Partnership Project, "Technical Specification Group Radio Access Network; RLC protocol specification (Release 1999)," 3GPP TS 25.322 V3.12.0 (Sep. 2002).
Third Generation Partnership Project, "Technical Specification Group Radio Access Network; High Speed Downlink Packet Access (HSDPA); Overall Description; Stage 2 (Release 5)," 3GPP TS 25.308 V5.2.0 (Mar. 2002).
Third Generation Partnership Project, "Technical Specification Group Radio Access Network; RLC protocol specification (Release 1999)," 3GPP TS 25.322 V3.10.0 (Mar. 2002).
Third Generation Partnership Project, "Technical Specification Group Services and System Aspects; Digital Cellular Telecommunications System (Phase 2+); General Packet Radio Service (GPRS); Service Description; Stage 2 (3G TS 23.060 Version 3.2.0)", 3G TS 23.060 Draft V3.2.0 (Dec. 1999).
Third Generation Partnership Project, "Technical Specification Group Radio Access Network; High Speed Downlink Packet Access (HSDPA); Overall Description; Stage 2 (Release 5)", 3GPP TS 25.308 V5.1.0 (Dec. 2001).
Third Generation Partnership Project, "Technical Specification Group Radio Access Network; RLC protocol specification (Release 4)," 3GPP TS 25.322 V4.4.0 (Mar. 2002).
Third Generation Partnership Project, "Technical Specification Group Radio Access Network; RLC protocol specification (Release 4)," 3GPP TS 25.322 V4.6.0 (Mar. 2002).
Third Generation Partnership Project, "Technical Specification Group Radio Access Network; RLC protocol specification (Release 5)," 3GPP TS 25.322 V5.0.0 (Mar. 2002).
Third Generation Partnership Project, "Technical Specification Group Radio Access Network; RLC protocol specification (Release 5)," 3GPP TS 25.322 V5.2.0 (Sep. 2002).
Third Generation Partnership Project, "Technical Specification Group Services and System Aspects; Digital Cellular Telecommunications System (Phase 2+); General Packet Radio Service (GPRS); Service Description; Stage 2 (Release 1999)", 3GPP TS 23.060 V3.10.0 (Jan. 2002).
Third Generation Partnership Project, "Technical Specification Group Services and System Aspects; Digital Cellular Telecommunications System (Phase 2+); General Packet Radio Service (GPRS); Service Description; Stage 2 (Release 1999)", 3GPP TS 23.060 V3.13.0 (Sep. 2002).
Third Generation Partnership Project, "Technical Specification Group Services and System Aspects; Digital Cellular Telecommunications System (Phase 2+); General Packet Radio Service (GPRS); Service Description; Stage 2 (Release 4)", 3GPP TS 23.060 V4.3.0 (Jan. 2002).
Third Generation Partnership Project, "Technical Specification Group Services and System Aspects; Digital Cellular Telecommunications System (Phase 2+); General Packet Radio Service (GPRS); Service Description; Stage 2 (Release 4)", 3GPP TS 23.060 V4.6.0 (Sep. 2002).
Third Generation Partnership Project, "Technical Specification Group Services and System Aspects; Digital Cellular Telecommunications System (Phase 2+); General Packet Radio Service (GPRS); Service Description; Stage 2 (Release 5)", 3GPP TS 23.060 V5.0.0 (Jan. 2002).
Third Generation Partnership Project, "Technical Specification Group Services and System Aspects; Digital Cellular Telecommunications System (Phase 2+); General Packet Radio Service (GPRS); Service Description; Stage 2 (Release 5)", 3GPP TS 23.060 V5.3.0 (Sep. 2002).
Third Generation Partnership Project, "Technical Specification Group Radio Access Network; MAC Protocol Specification (Release 1999)", 3GPP TS 25.321 V3.11.0, (Mar. 2002).
Third Generation Partnership Project, "Technical Specification Group Radio Access Network; RLC protocol specification (Release 1999)," 3GPP TS 25.322 V3.5.0 (Dec. 2000).
Third Generation Partnership Project, "Technical Specification Group Radio Access Network; RLC Protocol Specification (3G TS 25.322 version 3.0.0)," 3G TS 25.322 V3.0.0 (Oct. 1999).
Third Generation Partnership Project, "Universal Mobile Telecommunications System (UMTS); Radio Link Control (RLC) Protocol Specification (3GPP TS 25.322 Version 5.0.0 Release 5)", ETSI TS 125 322 V5.0.0 (Mar. 2002).
Third Generation Partnership Project, "Universal Mobile Telecommunications System (UMTS); Radio Link Control (RLC) Protocol Specification (3GPP TS 25.322 Version 5.3.0 Release 5)", ETSI TS 125 322 V5.3.0 (Dec. 2002).
Interdigital, "Inter-Node B (Intra-RNS) Hard Handover," 3GPP TSG-RAN Working Group 3, TSGW3#4(99)532 (Jun. 1-4, 1999).
Third Generation Partnership Project, "Technical Specification Group Radio Access Network; MAC Protocol Specification (Release 1999)", 3GPP TS 25.321 V3.13.0, (Sep. 2002).
Third Generation Partnership Project, "Technical Specification Group Radio Access Network; MAC Protocol Specification (Release 4)", 3GPP TS 25.321 V4.6.0 (Sep. 2002).
Third Generation Partnership Project, "Technical Specification Group Radio Access Network; MAC Protocol Specification (Release 5)", 3GPP TS 25.321, V5.0.0 (Mar. 2002).
Third Generation Partnership Project, "Technical Specification Group Radio Access Network; MAC Protocol Specification (Release 5)", 3GPP TS 25.321, V5.2.0 (Sep. 2002).
Third Generation Partnership Project, "Technical Specification Group Radio Access Network; MAC Protocol Specification (Release 4)", 3GPP TS 25.321, V4.4.0 (Mar. 2002).
Third Generation Partnership Project, "Technical Specification Group Radio Access Network; Radio Resource Control (RRC) Protocol Specification (Release 1999)", 3GPP TS 25.331, V3.12.0 (Sep. 2002).
Third Generation Partnership Project, "Technical Specification Group Radio Access Network; Radio Resource Control (RRC) Protocol Specification (Release 1999)", 3GPP TS 25.331, V3.10.0 (Mar. 2002).
Third Generation Partnership Project, "Technical Specification Group Radio Access Network; Radio Resource Control (RRC) Protocol Specification (Release 4)", 3GPP TS 25.331, V4.4.0 (Mar. 2002).
Third Generation Partnership Project, "Technical Specification Group Radio Access Network; Radio Resource Control (RRC) Protocol Specification (Release 4)", 3GPP TS 25.331, V4.7.0 (Sep. 2002).
Third Generation Partnership Project, "Technical Specification Group Radio Access Network; Radio Resource Control (RRC) Protocol Specification (Release 5)", 3GPP TS 25.331, V5.0.0 (Mar. 2002).
Third Generation Partnership Project, "Technical Specification Group Radio Access Network; Radio Resource Control (RRC) Protocol Specification (Release 5)", 3GPP TS 25.331, V5.2.0 (Sep. 2002).
Third Generation Partnership Project, "Technical Specification Group Radio Access Network; RLC protocol specification (Release 1999)," 3GPP TS 25.322 V3.12.0 (Sep. 2002).
Third Generation Partnership Project, "Technical Specification Group Radio Access Network; High Speed Downlink Packet Access (HSDPA); Overall Description; Stage 2 (Release 5)," 3GPP TS 25.308 V5.2.0 (Mar. 2002).
Third Generation Partnership Project, "Technical Specification Group Radio Access Network; RLC protocol specification (Release 1999)," 3GPP TS 25.322 V3.10.0 (Mar. 2002).
Third Generation Partnership Project, "Technical Specification Group Services and System Aspects; Digital Cellular Telecommunications System (Phase 2+); General Packet Radio Service (GPRS); Service Description; Stage 2 (3G TS 23.060 Version 3.2.0)", 3G TS 23.060 Draft V3.2.0 (Dec. 1999).
Third Generation Partnership Project, "Technical Specification Group Radio Access Network; High Speed Downlink Packet Access (HSDPA); Overall Description; Stage 2 (Release 5)", 3GPP TS 25.308 V5.1.0 (Dec. 2001).
Third Generation Partnership Project, "Technical Specification Group Radio Access Network; RLC protocol specification (Release 4)," 3GPP TS 25.322 V4.4.0 (Mar. 2002).

Third Generation Partnership Project, "Technical Specification Group Radio Access Network; RLC protocol specification (Release 4)," 3GPP TS 25.322 V4.6.0 (Mar. 2002).

Third Generation Partnership Project, "Technical Specification Group Radio Access Network; RLC protocol specification (Release 5)," 3GPP TS 25.322 V5.0.0 (Mar. 2002).

Third Generation Partnership Project, "Technical Specification Group Radio Access Network; RLC protocol specification (Release 5)," 3GPP TS 25.322 V5.2.0 (Sep. 2002).

Third Generation Partnership Project, "Technical Specification Group Services and System Aspects; Digital Cellular Telecommunications System (Phase 2+); General Packet Radio Service (GPRS); Service Description; Stage 2 (Release 1999)", 3GPP TS 23.060 V3.10.0 (Jan. 2002).

Third Generation Partnership Project, "Technical Specification Group Services and System Aspects; Digital Cellular Telecommunications System (Phase 2+); General Packet Radio Service (GPRS); Service Description; Stage 2 (Release 1999)", 3GPP TS 23.060 V3.13.0 (Sep. 2002).

Third Generation Partnership Project, "Technical Specification Group Services and System Aspects; Digital Cellular Telecommunications System (Phase 2+); General Packet Radio Service (GPRS); Service Description; Stage 2 (Release 4)", 3GPP TS 23.060 V4.3.0 (Jan. 2002).

Third Generation Partnership Project, "Technical Specification Group Services and System Aspects; Digital Cellular Telecommunications System (Phase 2+); General Packet Radio Service (GPRS); Service Description; Stage 2 (Release 4)", 3GPP TS 23.060 V4.6.0 (Sep. 2002).

Third Generation Partnership Project, "Technical Specification Group Services and System Aspects; Digital Cellular Telecommunications System (Phase 2+); General Packet Radio Service (GPRS); Service Description; Stage 2 (Release 5)", 3GPP TS 23.060 V5.0.0 (Jan. 2002).

Third Generation Partnership Project, "Technical Specification Group Services and System Aspects; Digital Cellular Telecommunications System (Phase 2+); General Packet Radio Service (GPRS); Service Description; Stage 2 (Release 5)", 3GPP TS 23.060 V5.3.0 (Sep. 2002).

Third Generation Partnership Project, "Technical Specification Group Radio Access Network; MAC Protocol Specification (Release 1999)", 3GPP TS 25.321 V3.11.0, (Mar. 2002).

Third Generation Partnership Project, "Technical Specification Group Radio Access Network; RLC protocol specification (Release 1999)," 3GPP TS 25.322 V3.5.0 (Dec. 2000).

Third Generation Partnership Project, "Technical Specification Group Radio Access Network; RLC Protocol Specification (3G TS 25.322 version 3.0.0)," 3G TS 25.322 V3.0.0 (Oct. 1999).

Third Generation Partnership Project, "Universal Mobile Telecommunications System (UMTS); Radio Link Control (RLC) Protocol Specification (3GPP TS 25.322 Version 5.0.0 Release 5)", ETSI TS 125 322 V5.0.0 (Mar. 2002).

Third Generation Partnership Project, "Universal Mobile Telecommunications System (UMTS); Radio Link Control (RLC) Protocol Specification (3GPP TS 25.322 Version 5.3.0 Release 5)", ETSI TS 125 322 V5.3.0 (Dec. 2002).

* cited by examiner

HIGH SPEED DOWNLINK SHARED CHANNEL CELL CHANGE

CROSS REFERENCE TO RELATED APPLICATION(S)

This application is a continuation of application Ser. No. 10/334,489, filed Dec. 30, 2002, which claims priority from U.S. Provisional Patent Application No. 60/370,740 filed Apr. 5, 2002, which is incorporated by reference as if fully set forth.

FIELD OF INVENTION

The present invention relates to the field of wireless communications. More specifically, the present invention relates to efficient recovery of buffered data following handover in a wireless system that distributes data from an intermediate point. Third generation (3G) systems having a remote network controller (RNC) which is coupled to one or more Node Bs, which are in turn wirelessly coupled to a plurality of User Equipment (UEs), employing adaptive modulation and coding (AMC) and hybrid automatic repeat request (H-ARQ) techniques are just one example of this kind of system.

BACKGROUND

A 3G Universal Terrestrial Radio Access Network (UTRAN) comprises several RNCs, each of which can be coupled to several Node Bs. A node B is an entity comprising one or more base stations, each managing traffic for one or more cells.

The 3G FDD and TDD systems typically use the RNC to buffer and schedule data transmissions to the UE. However, for the high speed channels of 3G cellular systems, data is buffered and scheduled for transmission by a Node B. One of these high speed channels, for example, is the High Speed Downlink Shared Channel (HS-DSCH). Since data is distributed by the Node B, it is necessary to buffer data for transmission in Node B. A result of this architecture is the RNC does not have an up-to-date status of the Node-B controlled transmissions of Packet Data Units (PDU). Therefore, upon handover between cells, it is necessary to coordinate the scheduling of data transmissions with the cell change. Otherwise following the cell change it is necessary to resynchronize data transmission to avoid loss or duplication of transmitted data. In 3G networks handover between cells is controlled by the RNC. Since the RNC that controls the cell the UE is in may change there is the possibility data may be lost or duplicated as a result of the handover. This problem is aggravated due to the architecture whereby there are several Node Bs associated with each RNC. There is a much higher likelihood that a mobile UE will require a Node B change than a change of RNC as a result of UE cell handovers.

The HS-DSCH utilizes AMC to enable high speed transmission of data and H-ARQ to increase the possibility of successful delivery of data. A serving HS-DSCH cell change is when the UE has to change the cell associated with the UTRAN access point that is performing transmission and reception of the serving HS-DSCH radio link. The serving HS-DSCH cell change is invoked when improved physical channel conditions and/or improved physical capacity is realized in an alternate cell. Unlike other channels in 3G networks that terminate at RNC within the UTRAN, the HS-DSCH terminates at Node B.

There are two types of HS-DSCH cell changes. An Intra-Node B serving HS-DSCH cell change is when the UE changes between two cells that are associated with the same Node B. An Inter-Node B serving HS-DSCH cell change is when the UE changes between two cells that are associated with different Node Bs. In an Inter-Node B cell change, the Node B before the serving HS-DSCH cell change is called the source Node B, and the Node B after the serving HS-DSCH cell change is called the target Node B.

There are peer Radio Link Control (RLC) entities in both the RNC and the UE providing an automatic repeat request (ARQ) function for transmission of data. The sending RLC entity signals a sequence number (SN) in the PDU header, which is used by the receiving RLC entity to ensure that no PDUs are missed in the transmission. If there are PDUs missed during the transmission, realized by out-of-sequence delivery of PDUs, the receiving RLC entity sends a status report PDU to inform the sending RLC entity that certain PDUs are missing. The status report PDU is used to describe the status of the data transmission. It identifies the SNs of the PDUs that are missed or received. If a PDU is missed, the sending RLC entity will retransmit a duplicate of the missed PDU to the receiving RLC.

It is also possible for the sending RLC entity to poll for a status report PDU from the receiving RLC entity, or to generate status reports periodically. The polling function provides a mechanism for the sending RLC entity to request the status of PDU transmissions.

A H-ARQ function in the Node B also provides for retransmission of failed transmissions. Although the H-ARQ operation removes some failed transmissions and increases the probability of successful delivery of data, it is the RLC protocol layer that ultimately ensures successful delivery.

Due to dynamic changes in propagation conditions, the HS-DSCH cell change must be performed rapidly to maintain quality of service. During the serving HS-DSCH cell change, it is possible that the UE stops transmission and reception in the source cell before all PDUs currently stored in the source Node B are successfully transmitted. Since the source Node B performs scheduling and buffering of the data, and since the data rates are very high, (for example 10 Mb/sec or higher), when the UE performs a serving HS-DSCH cell change, (especially for an Inter-Node B handover), there is a possibility that considerable amounts of data buffered in the source Node B will be lost. One reason for this data loss is that no mechanism exists within the UTRAN architecture for data buffered at the source Node B to be transferred to the target Node B. Upon serving a HS-DSCH cell change, the RNC has no information on how much, if any, data is lost since the RNC is not informed of Node B data transmission scheduling and if the transmission have been successfully acknowledged by the UE. Therefore when data is buffered in the source Node B upon serving HS-DSCH cell change to maintain transmission without loss of data, the RNC RLC must recover this data.

There are currently two preferred ways that prior art systems handle the recovery of data buffered at the source Node B. Following the HS-DSCH cell change: 1) the RNC can explicitly request a status PDU from the UE; or 2) the RNC can just start transmitting where it stopped in the source cell and out-of-sequence delivery realized by the UE will generate the status PDU.

In the first case, where the RNC explicitly requests a status PDU by polling the UE, the RNC must first wait until the physical channel is established in the new cell. The status PDU request is then sent and is received and processed by the UE. The UE generates the status PDU and sends it back to the RNC, which processes the status PDU and determines which PDUs are in need of retransmission.

In the second case, where the RNC just starts transmitting PDUs from where it stopped in the source cell, the UE recognizes the out-of-sequence delivery of data and generates a status PDU back to the RNC. The RNC processes the status PDU and learns which PDUs are in need of retransmission.

In either of these two cases, if data buffered in the source Node B needs to be recovered, then a status PDU will be processed, but proper reception of retransmitted data by the UE will be considerably delayed. This is due to delayed generation of the status PDU by the UE and reception of the status PDU in the RNC.

If transmission is being performed in RLC acknowledged mode, data is not passed to higher layers until in-sequence delivery of data can be performed. Accordingly, the UE will be required to buffer the out-of-sequence data until the missing PDUs can be retransmitted. This not only results in a delay of the transmission, but requires the UE to have a memory which is sufficiently large enough to buffer data until the data stored in the source Node B can be successfully delivered. Otherwise, the effective data transmission rate is reduced, thereby effecting quality of service. Since memory is very expensive, this is an undesirable design constraint.

Accordingly, the prior art methods of recovering data that is buffered in a source Node B prior to transfer to a target Node B have very undesirable consequences. It is desirable to have a system and method where data buffered in the source Node B can be more efficiently recovered with less delay to properly maintain user quality of service requirements.

SUMMARY

In response to initiation of a high speed-downlink shared channel (HS-DSCH) cell change, a reordering buffer of a medium access controller-high speed (MAC-hs) is flushed. A user equipment (UE) for at least one radio link control (RLC) instance mapped to the HS-DSCH generates a status report. The status report indicates missing HS-DSCH packet data units (PDUs).

BRIEF DESCRIPTION OF THE DRAWING(S)

DETAILED DESCRIPTION OF THE PREFERRED EMBODIMENT(S)

Figure 1:
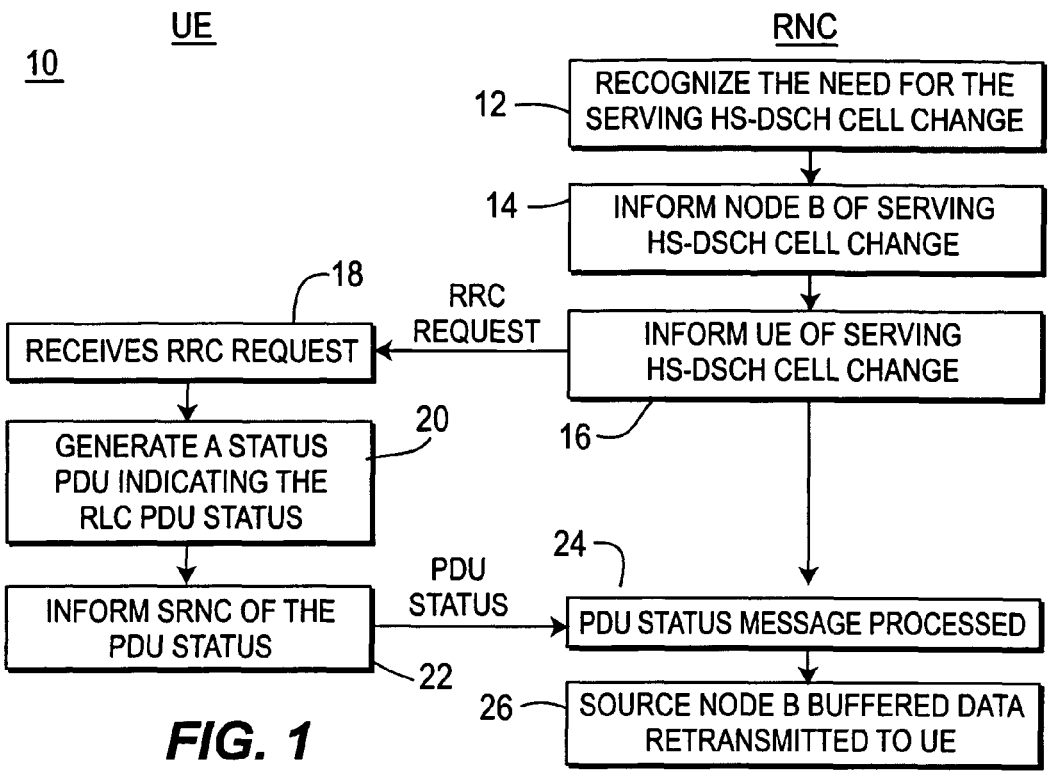
FIG. 1 is a flow diagram of an efficient procedure in accordance with the present invention for efficient recovery of Node B buffered data following an HS-DSCH cell change.

The preferred embodiment of the present invention will be described with reference to the drawing figures wherein like numerals represent like elements throughout.

According to the present invention, in order to reduce the latency for the RNC to obtain the status of the PDUs and recover data buffered in the source Node B, after the serving HS-DSCH cell change, the UE autonomously sends the status of the PDUs to the RNC following notification of the HS-DSCH cell change indicated by the RRC procedure. The generation of PDU status may be applied for each AM RLC instance associated with the HS-DSCH transport channel.

Referring to the flow diagram of FIG. 1, a method 10 of efficiently recovering Node B buffered data in accordance with the present invention is shown. The RNC recognizes the need for the serving HS-DSCH cell change (step 12). The Node B is then informed of the serving HS-DSCH cell change (step 14). The UE is informed of the serving HS-DSCH cell change, as indicated via the RRC Request message (step 16). It should be noted that it is also possible to invoke step 16 in advance of step 14 with no adverse consequences.

Once the RRC Request message is received by the UE in step 18, in order to reduce delay in recovering data buffered in the source Node B, the UE autonomously generates a status report (step 20) indicating the RLC PDU status as soon as possible following notification of the HS-DSCH cell change indicated by the RRC procedure. The UE does not wait for any of the prior art triggers for generating a status PDU, (for example, either a request by the RNC to generate a status PDU or the detection by the UE of out-of-sequence delivery of data).

In the UE, there are many different alternative methods that the UE may implement to trigger the generation of a PDU status report following a serving HS-DSCH cell change. However, several examples are presented herein. Preferably, as a first option, the MAC-hs informs the RLC once its reordering buffers are flushed. A second option is that the RRC informs the RLC of the Level 3 (L3) RRC procedure indicating the serving HS-DSCH cell change. Third, the physical layer can inform the RLC of the reception of HS-DSCH control channels in the target cell, or the physical layer can inform the RLC upon switch over of HS-DSCH control to the target cell. One skilled in the art would certainly realize that there may be other methods for triggering the RLC PDU status message to be sent from the UE to the RNC. As a result of this procedure, the PDU status is generated and sent to the RNC (step 22) with less delay, which results in more efficient recovery of source Node B buffered data.

In accordance with step 22, there are several alternatives for the UE to send the status report of the PDUs to the RNC. These methods of sending the status PDU are examples of how the status PDU can be signaled from the UE to the RNC and are not primary to the invention, which relates to generating a status PDU upon a new criterion. Preferably, the UE generates a RLC status report for each AM RLC instance mapped to the HS-DSCH transport channel.

In a second alternative, the UE sends the PDU status report via the first existing uplink message from the UE to the RNC as soon as a status report is obtained. For Intra-Node B serving cell changes, (and assuming that the HS-DSCH transport channel and radio bearer parameters are not changed), the message is "PHYSICAL CHANNEL RECONFIGURATION COMPLETE" on the DCCH. If the HS-DSCH transport channel and radio bearer parameters are changed and/or for Inter-Node B serving cell changes, the message is "TRANPSORT CHANNEL RECONFIGURATION COMPLETE" on the DCCH. The PDU status can be identified in any RRC signaling message. The RNC RRC entity then informs the status of the PDUs to the RLC to resume the transmission to the target Node B.

In a third alternative, the UE sends the status report on a new L3 signaling message on DCCH from the UE to the RNC. This new message is sent from the RRC layer of the UE to the RRC layer of the RNC. The RNC then informs the status of the PDUs to the RLC layer to resume the transmission to the target Node B. In this case, the PDU status message shown in FIG. 1 may comprise two separate messages "RRC Complete" and "RLC Status".

It should be noted that the specific format of the status report of the PDUs can vary. For example, the format of the status reports of the PDUs may include: 1) the sequence number (SN) of the last in-sequence successfully delivered PDUs; 2) the highest SN of the PDUs received successfully; 3) the SNs of the PDUs that are not received successfully, (i.e., missed PDUs) up to the highest SN of the PDU that are received successfully; 4) or a list of list the SNs of the PDUs that are received successfully.

Once the RNC receives the message carrying the PDU status, the PDU status message is processed by the RNC RLC (step 24) to determine the missed PDUs. The data lost as a result of the cell change is now realized by the RNC and can be retransmitted to the UE (step 26). It should be noted that the message can be of many alternatives, and is not necessarily limited to just carrying the PDU status report.

It should also be noted that in this embodiment of the present invention, the RNC, between steps 16 and 24, may continue to forward data in the target cell for transmission to the UE. Since the data will be out-of-sequence if all source Node B buffered data has not been successfully transmitted, the UE RLC will be forced to buffer the data to maintain in-sequence delivery to higher layers. This requires the UE to have sufficient memory to store the out-of-sequence PDUs. Following any loss of sequential data, transmission is limited to the UE memory capability until the lost sequential data is successfully transmitted.

Figure 2:
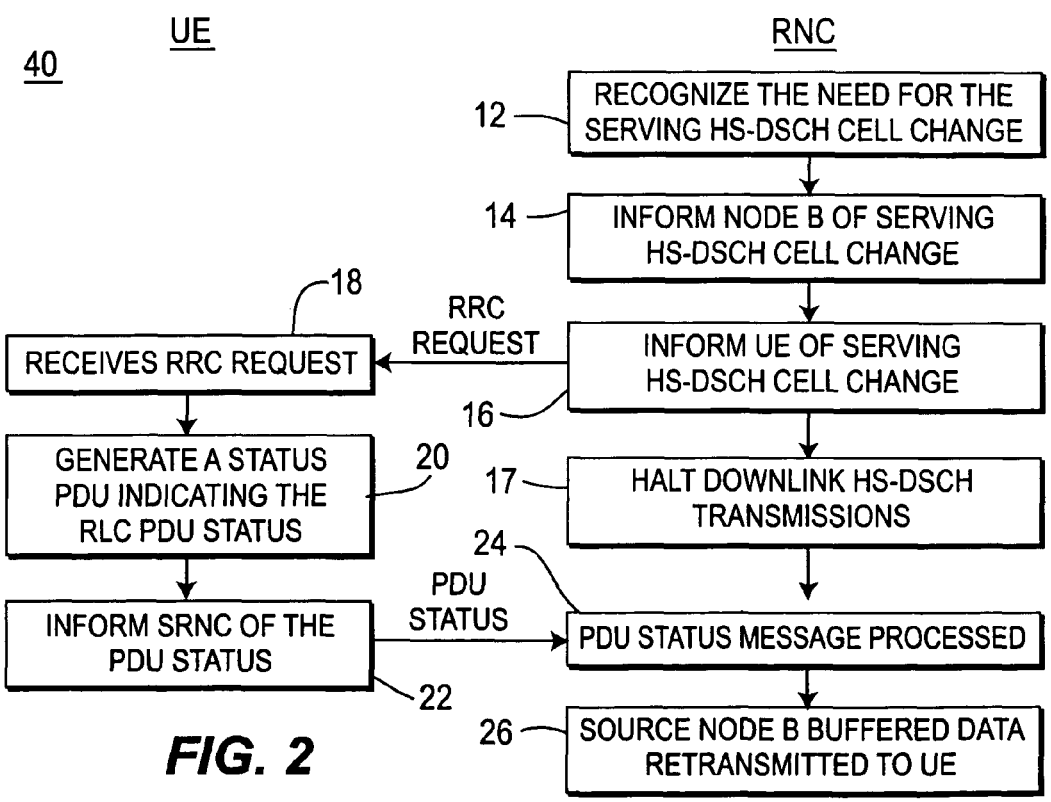
FIG. 2 is a flow diagram of an alternative method whereby the RNC waits for a status PDU prior to initiating a transmission of new data in the target cell.

Referring to the flow diagram of FIG. 2, a method 40 of efficiently recovering Node B buffered data in accordance with an alternative embodiment of the present invention is shown. This method 40 is similar to the method 10 shown in FIG. 1, and the steps of FIG. 2 that are labeled the same as in FIG. 1 are identical. However, in accordance with this embodiment of the present invention, the method 40 includes a new step 17 whereby the RNC halts all downlink HS-DSCH transmissions to the UE until the PDU status message is processed at step 24. This embodiment minimizes delay for retransmission of source Node B buffered data and limits the amount of data that must be buffered at the UE.

With respect to the minimization of delay, the Node B is unaware of RLC transmission sequence numbers and transmission scheduling within Node B is FIFO-based. Therefore, if data is forwarded by the RNC in the target cell before the PDU status is processed, it will be sent first. This data queuing in Node B results in a possibly further delay of retransmission of the source Node B buffered data.

The present invention may be applicable to both the HS-DSCH cell change in Inter-Node B cell changes and Intra-Node B cell changes. Since in the Intra-Node B case it may not be possible for the Node B to redirect the buffered HS-DSCH data to the target cell due to internal design issues, the RNC may indicate the need for generation of PDU status for both cases. It is also possible that the UE may be unable to distinguish between an Inter-Node B cell change and an Intra-Node B cell change, which would also result in generation of PDU status for both Inter and Intra cases. The status PDU sent in such a fashion will be useful in the Inter-Node B cell change or Intra-Node B case where the buffered data cannot be switched to the target cell.

Figure 3:
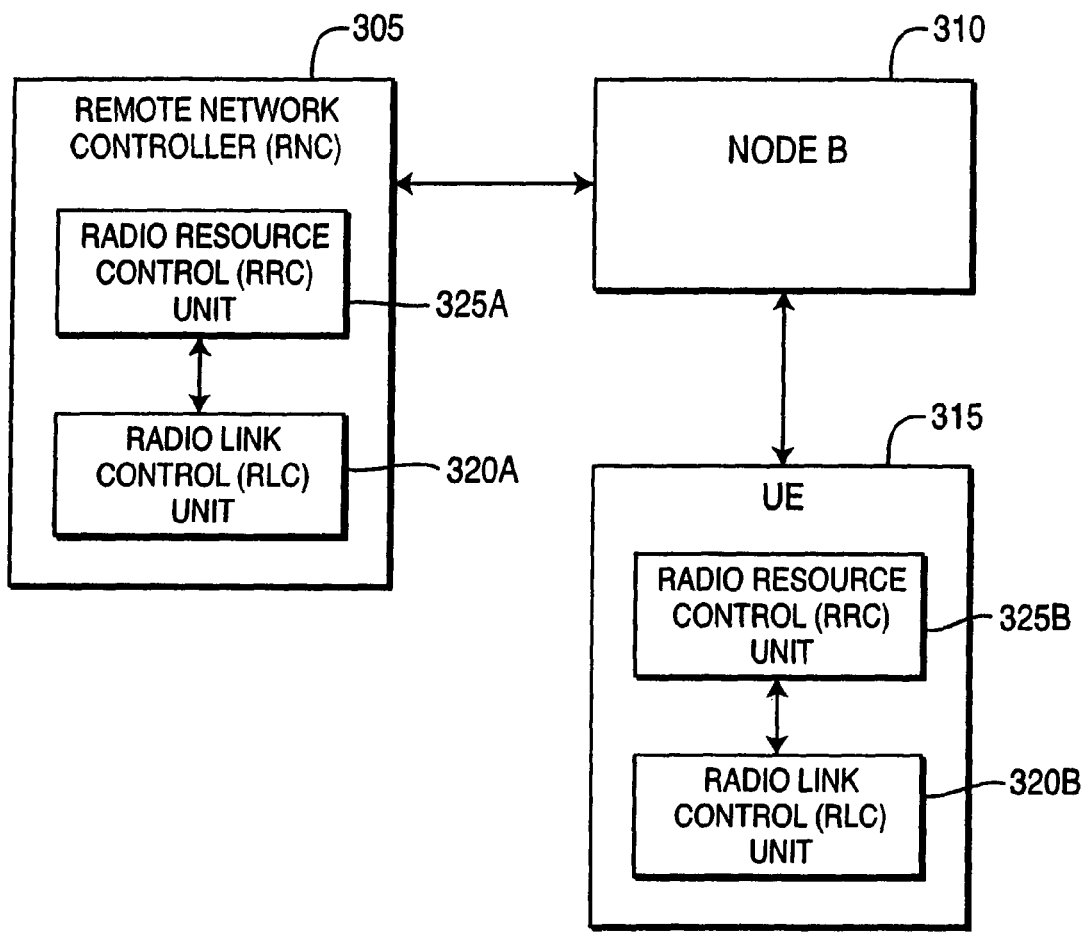
FIG. 3 is a block diagram of a wireless system used for implementing the methods depicted by FIGS. 1 and 2.

FIG. 3 is a block diagram of a wireless system 300 used for implementing the methods 10 and 40 depicted by FIGS. 1 and 2. System 300 includes an RNC 305, Node B 310 and UE 315. The RNC 305 includes an RLC unit (i.e., layer) 320A and an RRC unit 325A. The UE 315 includes an RLC unit 320B and an RRC unit 325B. When RNC 305 recognizes the need for the serving HS-DSCH cell change, the RRC unit 325A in RNC 305 generates an RRC Request message and Node B 310 is then informed of the serving HS-DSCH cell change. The UE 315 is informed of the serving HS-DSCH cell change, as indicated via the RRC Request message.

Once the RRC Request message is received by the UE 315, in order to reduce delay in recovering data buffered in the source Node B 310, the UE 315 autonomously generates a status report indicating the RLC PDU status as soon as possible following notification of the HS-DSCH cell change indicated by the RRC procedure.

There are several alternative embodiments for the UE 315 to send the status report of the PDUs to the RNC 305. Preferably, the UE 315 generates an RLC status report for each Acknowledged Mode (AM) RLC instance mapped to the HS-DSCH transport channel. Alternatively, the UE 315 sends the PDU status report via the first existing uplink message from the UE 315 to the RNC 305 as soon as a status report is obtained. The RRC unit 325A of RNC 305 then informs the status of the PDUs to the RLC unit 320A of RNC 305 to resume the transmission to the target Node B. In another alternative embodiment, the UE 315 sends the status report on a new L3 signaling message on DCCH from the UE 315 to the RNC 305. This new message is sent from the RRC unit 325B of UE 315 to the RRC unit 325A of RNC 305. The RNC 305 then informs the status of the PDUs to the RLC unit 320A to resume the transmission to the target Node B 310.

Once the RNC 305 receives the message carrying the PDU status, the PDU status message is processed by the RLC unit 320A of RNC 305 to determine the missed PDUs. The data lost as a result of the cell change is now realized by the RNC 305 and can be retransmitted to the UE 315.

Although the present invention has been described in detail, it is to be understood that the invention is not limited thereto, and that various changes can be made therein without departing from the spirit and scope of the invention, which is defined by the attached claims.

What is claimed is:

1. A user equipment (UE) which facilitates a high speed-downlink shared channel (HS-DSCH) cell change, the UE comprising:

circuitry configured to receive a wireless signal, the wireless signal carrying a radio resource control (RRC) request message from a Remote Network Controller (RNC) indicative of the HS-DSCH cell change;

high speed medium access control (MAC-hs) circuitry;

reordering buffers associated with the MAC-hs circuitry;

circuitry configured to flush the reordering buffers in response to receiving the RRC request message for the HS-DSCH cell change, the MAC-hs circuitry further configured to supply information indicative of the reordering buffers having been flushed; and radio link control (RLC) circuitry configured to autonomously generate status reports in response to the MAC-hs flushing the reordering buffers and send the status reports to the RNC, each of the status reports corresponding to a respective one of acknowledge mode (AM) RLC instances mapped to the HS-DSCH, the status reports indicating sequence numbers (SNs) of AM RLC packet data units (PDUs) that are missed and received by the UE.

2. A method for facilitating a high speed-downlink shared channel (HS-DSCH) cell change by a user equipment (UE), the UE comprising a high speed medium access control (MAC-hs) circuitry, and reordering buffers associated with the MAC-hs, the method comprising:

receiving, with the UE, a wireless signal carrying a radio resource control (RRC) request message from a Remote Network Controller (RNC) indicative of the HS-DSCH cell change;

flushing the reordering buffers in response to receiving the RRC request message for the HS-DSCH cell change;

supplying information, with the MAC-hs circuitry, indicative of the reordering buffers having been flushed; and autonomously generating status reports with radio link control (RLC) circuitry in response to the flushing of the MAC-hs reordering buffers and sending the status reports to the RNC, each of the status reports corresponding to a respective one of acknowledge mode (AM) RLC instances mapped to the HS-DSCH, the status reports indicating sequence numbers (SNs) of AM RLC packet data units (PDUs) that are missed and received by the UE.

3. A user equipment (UE) which facilitates a high speed-downlink shared channel (HS-DSCH) cell change, the UE comprising:

circuitry configured to receive a wireless signal, the wireless signal carrying a radio resource control (RRC) request message from a Remote Network Controller (RNC) indicative of the HS-DSCH cell change;

high speed medium access control (MAC-hs) circuitry;

reordering buffers associated with the MAC-hs circuitry;

circuitry configured to flush the reordering buffers in response to receiving first information associated with the RRC request message for the HS-DSCH cell change, the MAC-hs circuitry supplying second information indicative of the reordering buffers having been flushed and HS-DSCH packet data units (PDUs) received by the UE; and circuitry configured to autonomously generate status reports using radio link control (RLC) circuitry in response to the second information and send the status reports to the RNC, the status report corresponding to an acknowledge mode (AM) radio link control (RLC) instance mapped to the HS-DSCH, the status report indicating sequence numbers (SNs) of AM RLC PDUs that are missed and received by the UE.

4. The UE of claim 3, wherein the circuitry configured to generate status reports is further configured to supply additional status reports, the additional status reports being associated with other AM RLC instances mapped to the HS-DSCH, the additional status reports indicating additional sequence numbers (SNs) of AM RLC PDUs that are missed and received by the UE.

5. A method for facilitating a high speed-downlink shared channel (HS-DSCH) cell change by a user equipment (UE), the UE comprising high speed medium access control (MAC-hs) circuitry, and reordering buffers associated with the MAC-hs, the method comprising:

receiving, with the UE, a wireless signal carrying a radio resource control (RRC) request message from a Remote Network Controller (RNC) indicative of the HS-DSCH cell change;

flushing the reordering buffers in response to receiving first information associated with the RRC request message for the HS-DSCH cell change, the MAC-hs circuitry supplying second information indicative of the reordering buffers having been flushed and HS-DSCH packet data units (PDUs) received by the UE; and autonomously generating a status report using radio link control (RLC) circuitry, in response to the second information and sending the status reports to the RNC, the status report corresponding to an acknowledge mode (AM) radio link control (RLC) instance mapped to the HS-DSCH, the status report indicating sequence numbers (SNs) of AM RLC PDUs that are missed and received by the UE.

6. The method of claim 5, further comprising:

generating additional status reports, the additional status reports being associated with other AM RLC instances mapped to the HS-DSCH, the additional status reports indicating additional sequence numbers (SNs) of AM RLC PDUs that are missed and received by the UE.

* * * * *